United States Patent
Zhu (10) Patent No.: US 10,715,854 B2
(45) Date of Patent: Jul. 14, 2020

(54) METHOD AND APPARATUS FOR PUSHING INFORMATION

(71) Applicant: Baidu Online Network Technology (Beijing) Co., Ltd., Beijing (CN)

(72) Inventor: Chenxi Zhu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 214 days.

(21) Appl. No.: 15/748,485

(22) PCT Filed: Jun. 28, 2016

(86) PCT No.: PCT/CN2016/087450
§ 371 (c)(1),
(2) Date: Jan. 29, 2018

(87) PCT Pub. No.: WO2017/133172
PCT Pub. Date: Aug. 10, 2017

(65) Prior Publication Data
US 2018/0227617 A1 Aug. 9, 2018

(30) Foreign Application Priority Data

Feb. 1, 2016 (CN) .......................... 2016 1 0070032

(51) Int. Cl.
*H04N 21/262* (2011.01)
*H04N 21/4722* (2011.01)
(Continued)

(52) U.S. Cl.
CPC ......... *H04N 21/262* (2013.01); *H04N 21/233* (2013.01); *H04N 21/2353* (2013.01);
(Continued)

(58) Field of Classification Search
CPC ............... H04N 21/262; H04N 21/233; H04N 21/23418; H04N 21/4722; H04N 21/4788;
(Continued)

(56) References Cited

U.S. PATENT DOCUMENTS

| | | | |
|---|---|---|---|
| 2008/0046925 A1* | 2/2008 | Lee ........................ | G11B 27/11 725/37 |
| 2009/0164460 A1 | 6/2009 | Jung et al. | |

(Continued)

FOREIGN PATENT DOCUMENTS

| | | |
|---|---|---|
| CN | 101634987 A | 1/2010 |
| CN | 104462495 A | 3/2015 |

(Continued)

OTHER PUBLICATIONS

Soussan Djamasbi, Social Viewing, Bullet Screen, & User Experience: A First Look, Jan. 2016, uxdm.wpi.edu, https://uxdm.wpi.edu/research/2016-Bullet-Screen-HICSS16-Y15M9D14.pdf (Year: 2016).*

(Continued)

*Primary Examiner* — Zi Ye
(74) *Attorney, Agent, or Firm* — Miller, Matthias & Hull LLP (57) ABSTRACT

The present disclosure discloses a method and apparatus for pushing information. A specific embodiment of the method comprises: acquiring video information of a video played by a user using a terminal, and analyzing the video information to generate a keyword set; selecting at least one piece of candidate push information to generate a set of push information, based on a matching relationship between the keyword set and each piece of candidate push information; and pushing the set of push information to the terminal. This embodiment improves pertinence of the pushing for the information.

11 Claims, 6 Drawing Sheets

(51) Int. Cl.
*H04N 21/488* (2011.01)
*H04N 21/81* (2011.01)
*H04N 21/258* (2011.01)
*H04N 21/235* (2011.01)
*H04N 21/8405* (2011.01)
*H04N 21/233* (2011.01)
*H04N 21/234* (2011.01)
*H04N 21/4788* (2011.01)

(52) U.S. Cl.
CPC . *H04N 21/23418* (2013.01); *H04N 21/25866* (2013.01); *H04N 21/4722* (2013.01); *H04N 21/4788* (2013.01); *H04N 21/4882* (2013.01); *H04N 21/4884* (2013.01); *H04N 21/812* (2013.01); *H04N 21/8405* (2013.01)

(58) Field of Classification Search
CPC ............ H04N 21/812; H04N 21/4882; H04N 21/4884
USPC .......................................................... 709/206
See application file for complete search history.

(56) References Cited

U.S. PATENT DOCUMENTS

| | | | |
|---|---|---|---|
| 2010/0248758 A1* | 9/2010 | Kim | H04W 4/12 455/466 |
| 2012/0030713 A1 | 2/2012 | Begeja et al. | |
| 2013/0305272 A1 | 11/2013 | Fullett et al. | |
| 2014/0330933 A1* | 11/2014 | Papakipos | G06Q 10/10 709/217 |
| 2015/0019203 A1 | 1/2015 | Smith et al. | |
| 2016/0277328 A1 | 9/2016 | Ishizuka | |
| 2016/0366466 A1* | 12/2016 | Shen | H04N 21/431 |
| 2017/0251240 A1 | 8/2017 | Peng | |

FOREIGN PATENT DOCUMENTS

| | | |
|---|---|---|
| CN | 104504061 A | 4/2015 |
| CN | 104754418 A | 7/2015 |
| CN | 105095394 A | 11/2015 |
| CN | 105578222 A | 5/2016 |
| JP | 2013011967 | 1/2013 |
| JP | 2015100039 | 5/2015 |

OTHER PUBLICATIONS

Search Report for related International Application No. PCT/CN2016/087450; dated Nov. 8, 2016.

* cited by examiner

METHOD AND APPARATUS FOR PUSHING INFORMATION

CROSS-REFERENCE TO RELATED APPLICATION

This present disclosure is a 35 USC § 371 US National Stage filing of International Application No. PCT/CN2016/087450 filed on Jun. 28, 2016, and claims the priority of Chinese Patent Application No. 201610070032.8 filed on Feb. 1, 2016, the content of which is incorporated herein by reference in its entirely.

TECHNICAL FIELD

The present disclosure relates to the field of computer technology, specifically to the information push in the multimedia playing field, and more specifically to a method and apparatus for pushing information.

BACKGROUND

The simultaneous appearance of a large number of comments displayed in a subtitle form is called a bullet screen. A bullet screen video numerous user comments on a video in a scrolling form when the video is played. The bullet screen, as a viewer actively participated, real-time video content interacting text, may comprehensively reflect information related to the video clip and the bullet screen sender.

Currently, the approach for placing information that needs to be specially pushed by a website or web page (for example, an advertisement to be inserted in the video) is still simple. The existing placing approaches mainly include: insertion of the video or page information to be specially pushed before or during the video, resulting in a poor correlation and a low conversion rate for the information displayed using this approach. The bullet screen information, and the information reflecting the video clip and the bullet screen sender, which information is contained in the bullet screen information are not fully discovered, and the information of the bullet screen is not combined with the information to be specially pushed by the website or web page.

SUMMARY

The objective of the present disclosure is to provide a method and apparatus for pushing information to solve the technical problems mentioned in the foregoing Background section.

In a first aspect, the present disclosure provides a method for pushing information, comprising: acquiring video information of a video played by a user using a terminal, the video information comprising bullet screen information; analyzing the video information to generate a keyword set; selecting at least one piece of candidate push information to generate a set of push information, based on a matching relationship between the keyword set and each piece of candidate push information; and pushing the set of push information to the terminal.

In some embodiments, the video information further comprises at least one of title information of the video, subtitle information of the video, audio information of the video, and image frame information included in the video.

In some embodiments, the analyzing the video information to generate a keyword set, comprises: performing a statistical analysis and/or a semantic analysis on the video information to extract a keyword to generate the keyword set.

In some embodiments, the candidate push information comprises text content, and a link associated with the text content.

In some embodiments, the selecting at least one piece of candidate push information to generate a set of push information, based on a matching relationship between the keyword set and each piece of candidate push information, comprises: acquiring user information of the user; and selecting the at least one piece of candidate push information to generate the set of push information, based on the matching relationship between the keyword set and the each piece of candidate push information, and a matching relationship between the user information and the each piece of candidate push information.

In a second aspect, the present disclosure provides an apparatus for pushing information, comprising:

a receiving unit, configured to acquire video information of a video played by a user using a terminal, the video information comprising bullet screen information; an analyzing unit, configured to analyze the video information to generate a keyword set; a matching unit, configured to select at least one piece of candidate push information to generate a set of push information, based on a matching relationship between the keyword set and each piece of candidate push information; and a pushing unit, configured to push the set of push information to the terminal.

In some embodiments, the video information further comprises at least one of title information of the video, subtitle information of the video, audio information of the video, and image frame information included in the video.

In some embodiments, the analyzing unit is further configured to perform a statistical analysis and/or a semantic analysis on the video information to extract a keyword to generate the keyword set.

In some embodiments, the candidate push information comprises text content, and a link associated with the text content.

In some embodiments, the matching unit comprises: a user information acquiring subunit, configured to acquire user information of the user; and an information selecting subunit, configured to select the at least one piece of candidate push information to generate the set of push information, based on the matching relationship between the keyword set and the each piece of candidate push information, and a matching relationship between the user information and the each piece of candidate push information.

The method and apparatus for pushing information provided by the present disclosure, by analyzing acquired video information, generating a keyword set, and selecting at least one piece of candidate push information to generate a set of push information based on a matching relationship between the generated keyword set and the candidate push information, push the set of push information to the terminal in a form of bullet screen information. In this method, by analyzing information of the bullet screen, the information in the bullet screen and interests and needs of a bullet screen sender are deep discovered, and the push information matching the bullet screen information is pushed to a user terminal in the form of bullet screen information. Accordingly, the information can be placed with pertinence.

BRIEF DESCRIPTION OF THE DRAWINGS

After reading detailed descriptions of non-limiting embodiments with reference to the following accompanying drawings, other features, objectives and advantages of the present disclosure will be more apparent:

FIG. 6 is a schematic structural diagram of a computer system adapted to implement a terminal device or a server according to embodiments of the present disclosure.

DETAILED DESCRIPTION

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
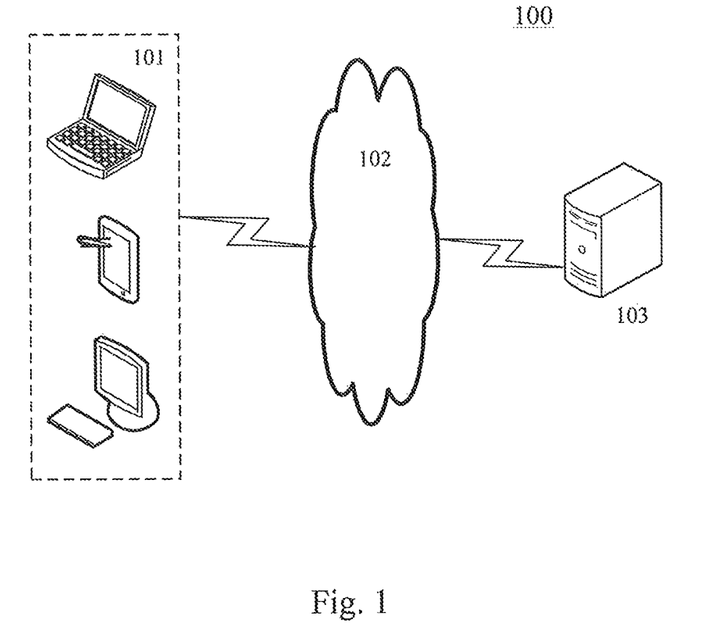
FIG. 1 is an exemplary system architecture diagram in which the present disclosure may be applied.

FIG. 1 shows an exemplary architecture of a system 100 which may be used by a method and apparatus for pushing information according to the embodiments of the present disclosure.

As shown in FIG. 1, the system architecture 100 may include terminal devices 101, 102 and 103. The network 102 serves as a medium providing a communication link between the terminal devices 101 and 103. The network 102 may include various types of connections, such as wired or wireless transmission links, or optical fibers.

The user may use the terminal device 101 to interact with the server 103 through the network 102, in order to transmit or receive messages, etc. Various communication client applications, such as cloud storage applications, shopping applications, search applications, instant messaging tools, mailbox clients, and social platform software may be installed on the terminal device 101.

The terminal device 101 may be various electronic devices having a display screen and capable of webpage browsing, including but not limited to, smart phones, tablet computers, e-book readers, laptop computers and desktop computers.

The server 103 may be a server providing various services, for example, a background web page server providing support to a web page displayed on the terminal device 101. The background web page server may perform a process such as analysis on data like a received site request and web page request, and feed the process result (for example, page data and page content data of a webpage) back to the terminal device.

It should be noted that a method for pushing information provided in embodiments of the present disclosure is generally performed by the server 103. Correspondingly, an apparatus for pushing information is generally installed in the server 103.

It should be appreciated that the numbers of the terminal devices, the networks and the servers in FIG. 1 are merely illustrative. Any number of terminal devices, networks and servers may be provided based on implementation requirements.

Figure 2:
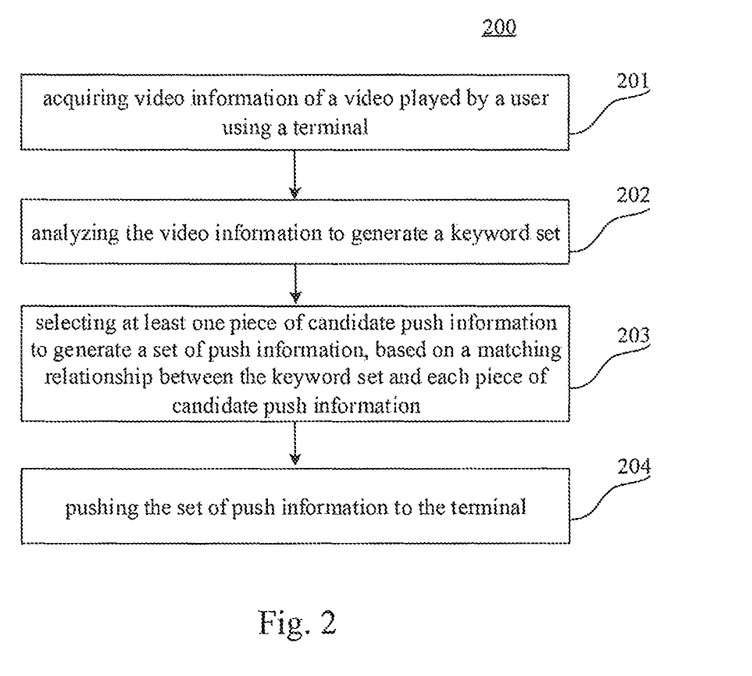
FIG. 2 is a flowchart of an embodiment of a method for pushing information according to the present disclosure.

Further referring to FIG. 2, which illustrates a flow 200 of an embodiment of a method for pushing information according to the present disclosure. The method for pushing information includes the following steps.

In step 201, acquiring video information of a video played by a user using a terminal.

In this embodiment, an electronic device (for example, the server 103 as illustrated in FIG. 1) on which the method for pushing information is performed may receive a web page browsing request from the terminal using which the user browses a webpage by means of wired connection or wireless connection. The web page browsing request includes an address of the webpage (i.e., a website address) which the user desires to browse. The server acquires the video information of the video played by the user using the terminal by responding to the website address of the web page.

The video information includes bullet screen information, and the bullet screen information is presented on the terminal with the play of the video. The bullet screen information is text information with regard to comments of the video and information related to the comments of the video, which appear on the screen of the terminal in a bullet screen form during the play of the video.

In some implementations of this embodiment, the video information further includes at least one of title information of the video, subtitle information of the video, audio information of the video, and image frame information included in the video. The image frame information includes information of the image frame itself in the video, and information after the image frame is analyzed.

In step 202, analyzing the video information to generate a keyword set.

In this embodiment, based on the website address obtained in step 201, the electronic device (for example, the server as illustrated in FIG. 1) may first acquire the video corresponding to the website address, and then analyze the video information by various analysis means, to extract one or more keywords.

In some alternative implementations of this embodiment, an approach for analyzing the video information may be a statistical analysis approach. For instance, the subtitle information in the video information of the web page may be analyzed to generate the keywords. For instance, there appears a paragraph of text "Jian'an abounds with soybeans, the local soybeans are the best raw materials for making Tofu, the Marinated Tofu is made by the local people through 13 processes, and this kind of Tofu looks glittering and translucent and tastes delicate and delicious." in the subtitle information. The subtitle information includes "Jian'an, soybeans, making Tofu, Tofu, Marinated Tofu and processes" etc. The occurrence frequencies of the words or sentences appearing in the subtitle are counted and sorted. Then, one or more words of which the frequencies of occurrence rank in the top are selected as to-be-extracted keywords of the text. For instance, "soybeans, Tofu and Marinated Tofu" are selected as the keywords.

In this embodiment, analyzing the video information includes analyzing the title information of the video, the subtitle information of the video, the audio information of the video, the image frame information included in the video and the bullet screen information presented with the play of the video.

Non-text information is turned into text information. For the audio information of the video, voice recognition is performed to generate text information related to voice or audio. For the image frame information included in the video, image recognition is performed to generate text information related to a picture or an image.

In some alternative implementations of this embodiment, for the image frame information of the video information, the image recognition is performed to generate the text information related to the picture or the image. For instance, an image frame of a fresh flower appearing in the video, according to the image recognition technology, is described as the text information related to the image: "Malian Hua, a kind of fresh flower growing in desert, the colors of which are gorgeous, and when it blooms, this kind of flower will be blue, white, yellow, cyan and other colors . . . ". This text information is analyzed to generate keywords "Malian Hua, desert and fresh flower".

In some alternative implementations of this embodiment, analyzing the video information may also be analyzing the bullet screen information. Analyzing the bullet screen information includes extracting the comment information appearing in the video in the bullet screen form and analyzing the comment information. For instance, when the processes of making the Marinated Tofu are played in the video, the comments of terminal users "I want to eat Tofu, Tofu—My favourite is finally here, I extremely love to eat all kinds of Tofu . . . " continue to appear in the video. The keywords "Tofu, Marinated Tofu and Stinky Tofu" are generated after the comment information is analyzed.

The keywords in the video information are expanded to generate expanded keywords. The expanded keywords include the keyword and at least one of: the synonyms of this keyword (for example, the keyword "hotel" may have synonyms "restaurant", "tavern", "inn" and "guesthouse"); the near synonyms of this keyword (for example, the keyword "Iris ensata Thunb" may have near synonyms "Malan Hua" and "Malan"); and an associated word "network construction" of the keyword "website construction". The keyword and the expanded keywords of the keyword in the video information are collected to generate the keyword set.

In step 203, selecting at least one piece of candidate push information to generate a set of push information, based on a matching relationship between the keyword set and each piece of candidate push information.

In this embodiment, the matching may be performed between the keyword set generated in step 202 and each piece of candidate push information, and at least one piece of candidate push information may be selected to generate the set of push information according to the matching relationship. The candidate push information not only includes text content, but also includes a link related to the text content.

The electronic device may match the keyword set with the each piece of candidate push information one by one respectively, and determine the matching relationship between each piece of candidate push information and the keyword set according to the number of the keywords included in the each piece of candidate push information. For example, if some piece of candidate push information includes all the keywords in the keyword set, it can be determined that there exists a complete matching relationship between this piece of the candidate push information and the keyword set. If some piece of candidate push information includes a part of the keywords in the keyword set, it can be determined that there exists a partial matching relationship between this piece of candidate push information and the keyword set. If some piece of candidate push information does not include any keywords in the keyword set, it can be determined that there exists a non-matching relationship between this piece of candidate push information and the keyword set. According to the matching relationships between the candidate push information and the keyword set, the electronic device may select at least one piece of candidate push information from many pieces of the candidate push information, so as to generate the set of push information. For instance, the electronic device may select a piece of candidate push information satisfying the complete matching relationship with the keyword set, as the push information combined with the video information. If the text information of the piece of candidate push information is "Changchun bean products, Tofu franchisee, wholesale Tofu [click to receive a red packet]," which completely matches "Tofu, Jian'an Tofu, Marinated Tofu and Tofu—My favourite" in the keyword set, this piece of candidate push information will be added into the set of push information.

In step 204, pushing the set of push information to the terminal.

In this embodiment, one or more pieces of candidate push information in the set of push information, which is generated in step 203, are presented on the terminal with the play of the video in the bullet screen form.

In this embodiment, the set of push information is pushed to the terminal, and this set of push information is presented on the terminal with the play of the video in a form of bullet screen information. The set of push information may be presented at a fixed position on the screen of the terminal in the form of bullet screen information, and may also drift or scroll across the screen in the form of bullet screen information.

According to the matching relationships in step 203, the candidate push information matching the keyword set is selected from the set of push information. For instance, a keyword matching the candidate push information is selected from the keyword set, and the keyword corresponds to any one of: the subtitle information of the video, the audio information of the video, the image frame information included in the video and the bullet screen information presented with the play of the video. After the subtitle information of the video, the audio information of the video, the image frame information included in the video and the bullet screen information presented with the playing of the video, which correspond to the keyword, are displayed, one piece of the candidate push information in the set of push information is displayed in the bullet screen form. The terminal user clicks the bullet screen information to link to a web link related to the text content of the bullet screen information.

In some alternative implementations of this embodiment, when the video information corresponding to the keywords appears in the video, the electronic device may push the piece of the candidate push information in the set of push information completely matching the keywords at a mobile terminal in the bullet screen form.

In some alternative implementations of this embodiment, specifically, the candidate push information may be first pushed after the keyword corresponding to the bullet screen information appears. There exists the complete matching relationship between the candidate push information and the keyword corresponding to the bullet screen information that is presented with the play of the video. For instance, when comments like "I love xxx", "xxx—my favourite", or "I like xxx" appear in the comment information of the bullet information presented with the play of the video, corresponding candidate push information is first pushed. Xxx is the keyword closely related to the text content of the candidate push information. For instance, the text content of the candidate push information is "Changchun bean products, Tofu franchisee, wholesale Tofu [click to receive a red packet]," when the comment "Tofu—My favourite" appears in the comments of the video, "Tofu" in the candidate push information is the same as the keyword "Tofu" in the keyword set, and accordingly, there exists the complete matching relationship between the candidate push information and the keyword set corresponding to the bullet screen information that is presented with the playing of the video. The candidate push information is displayed on the video in the bullet screen form.

In the method provided by the above embodiments of the present disclosure, the keyword of the video information is extracted by analyzing the video information, the keyword set is generated after the keyword is expanded, the set of push information is selected by matching the keyword set with the candidate push information, and one or more pieces of the candidate push information in the set of push information are pushed in the bullet screen form in the video.

Figure 3:
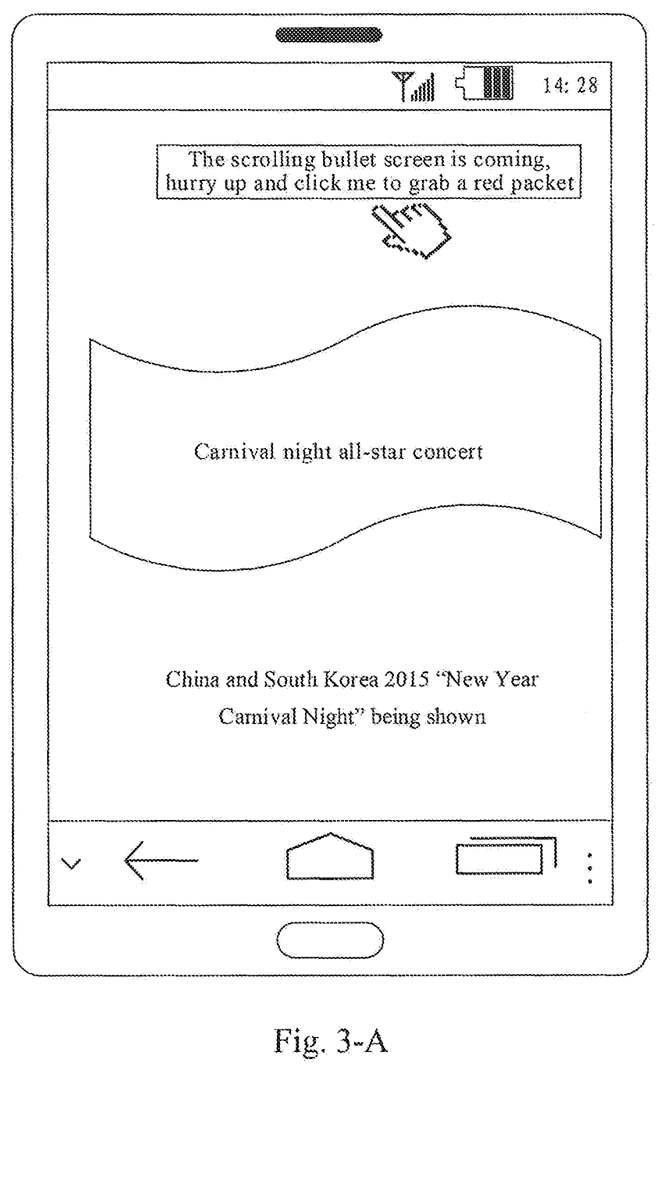
FIG. 3 is a schematic diagram of an application scenario of the method for pushing information according to the present disclosure.

Further referring to FIG. 3, which is a schematic diagram of an application scenario of a method for pushing information according to this embodiment. In the application scenario of FIG. 3, the candidate push information may appear at a fixed position. As shown in FIG. 3-A, when the video information "carnival night all-star concert" appears in the video, the candidate push information "the scrolling bullet screen is coming, hurry up and click me to grab a red packet" is pushed at the top of the video in the form of bullet screen information. The candidate push information may also scroll across the screen in the form of bullet screen information. As shown in FIG. 3-B, the user first initiates a video browsing request; next, a webpage server may acquire video information of the above video in the background, and extract the keyword "Tofu"; then, the webpage server searches one or more pieces of candidate push information matching the keyword "Tofu" from pre-stored candidate push information to be served as the candidate push information; and finally, the web server may adopt an approach that the candidate push information is associated with the keyword "Tofu". When the user views the video, when the video information corresponding to the keyword "Tofu" appears in the video, for example, when "Tofu is an indispensible dish on the table of the local people, which tastes delicate . . . " appears in the subtitle information of the video, the candidate push information "Changchun bean products, Tofu franchisee, wholesale Tofu [click to receive a red packet]" is pushed on the terminal of the user in the bullet screen form.

In the method provided by the above embodiments of the present disclosure, information is pushed with pertinence by associating the video information with the candidate push information.

Figure 4:
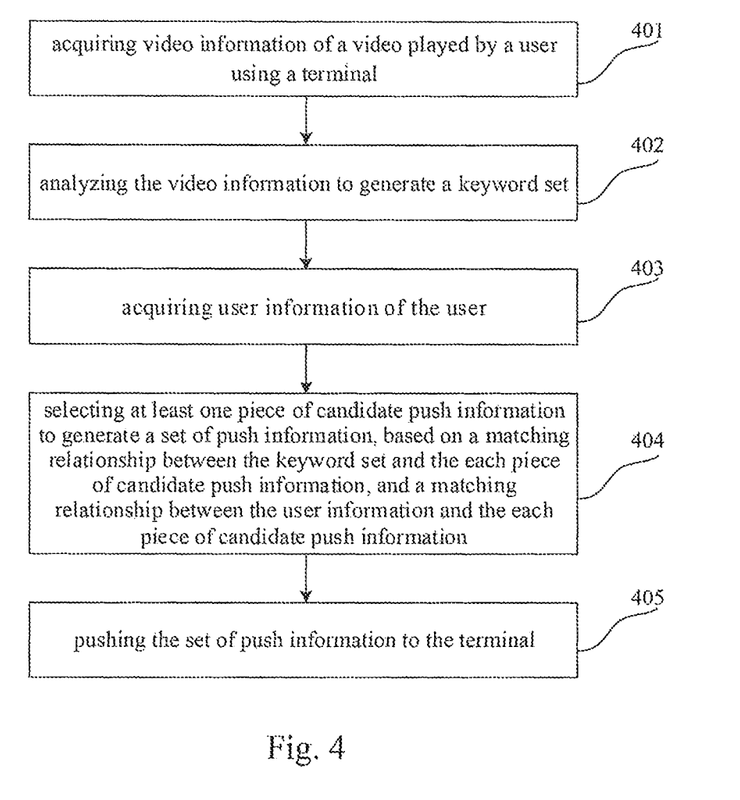
FIG. 4 is a flowchart of another embodiment of the method for pushing information according to the present disclosure.

Further referring to FIG. 4, which illustrates a flow 400 of another embodiment of a method for pushing video according to the present disclosure. The flow 400 of this method includes the following steps.

In step 401, acquiring video information of a video played by a user using a terminal.

In this embodiment, an electronic device (for example, the server 103 as illustrated in FIG. 1) on which a method for pushing information is performed may acquire the video information of the video played by the user using the terminal by means of wired connection or wireless connection.

The video information includes bullet screen information, and the bullet screen information is presented with the play of the video. The bullet screen information is text information with regard to comments of the video and information related to the comments of the video, which appear on a screen of the terminal in a bullet screen form during the play of the video.

In some implementations of this embodiment, the video information further includes at least one of title information of the video, subtitle information of the video, audio information of the video, and image frame information included in the video. The image frame information includes information of the image frame itself in the video, and information after the image frame is analyzed.

In step 402, analyzing the video information to generate a keyword set.

In this embodiment, based on the video and the video information acquired step 401, the above video information is analyzed by various analysis means, so as to extract one or more keywords. Each keyword is expanded to generate an expanded keyword, and the keyword set is generated based on the keyword and the expanded keyword.

In step 403, acquiring user information of the user.

In this embodiment, the user information acquired by the server includes at least one of the account information of the user, the access history of the user, and the current position of the user. The account information of the user includes at least one of the age of the user, the gender of the user, the occupation of the user, the access history of the user for videos, and the viewing time of the user.

In step 404, selecting at least one piece of candidate push information to generate a set of push information, based on a matching relationship between the keyword set and each piece of candidate push information, and a matching relationship between the user information and each piece of candidate push information.

In this embodiment, the candidate push information may be pushed for a specific group of people to place the information with pertinence. The owner of the candidate push information may establish user characteristics of this candidate push information. By analyzing the user information and matching the candidate push information, the server selects the candidate push information satisfying the matching relationship to generate the set of push information. For instance, in a piece of the candidate push information with regard to "sending flowers to the beauty, Shenyang flower wholesale", the group of people is set to males, aged 18-35 and located in Shenyang. The candidate push information is selected to generate the set of push information, according to the matching relationship between the user information and the candidate push information and the matching relationship between the keyword set and the each piece of candidate push information.

In step 405, pushing the set of push information to the terminal.

One or more pieces of the candidate push information in the set of push information are presented on the terminal of the user with the play of the video in the form of bullet screen information.

In this embodiment, the one or more pieces of the candidate push information in the set of push information may be presented at a fixed position on the terminal screen, and the candidate push information may also drift across the screen in a bullet screen form.

As shown in FIG. 4, different from the embodiment corresponding to FIG. 2, the candidate push information is selected to be placed according to the matching relationship between the user information and the candidate push information. In this embodiment, the limitation to the group of people to which the candidate push information is placed is emphasized, and thus, the placing for the information to a specific user group may be implemented more precisely.

Figure 5:
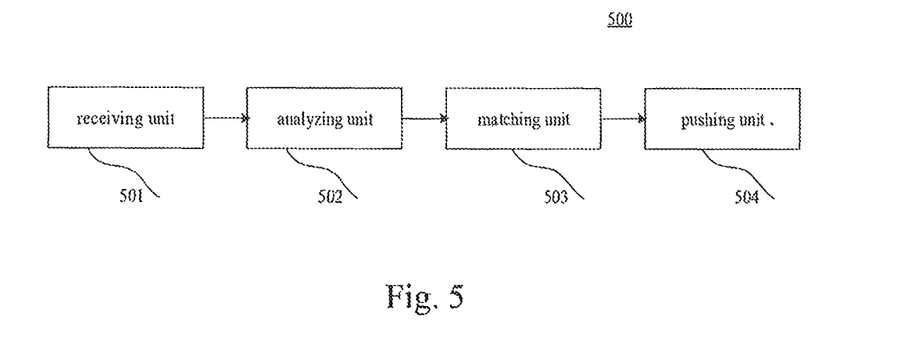
FIG. 5 is a schematic structural diagram of an embodiment of an apparatus for pushing information according to the present disclosure.

Further referring to FIG. 5, as an implementation of the method shown in each of the above-mentioned figures, the present disclosure provides an embodiment of an apparatus for pushing information. The embodiment of this apparatus corresponds to the embodiment of the method as illustrated in FIG. 2, and this apparatus may be applied in various electronic devices.

As shown in FIG. 5, the apparatus for pushing information 500 in this embodiment includes:

a receiving unit, an analyzing unit, a matching unit, and a pushing unit. The receiving unit is configured to acquire video information of a video played by a user using a terminal, the video information including bullet screen information; the analyzing unit is configured to analyze the video information to generate a keyword set; the matching unit is configured to select at least one piece of candidate push information to generate a set of push information, based on a matching relationship between the keyword set and each piece of candidate push information; and the pushing unit is configured to push the set of push information to the terminal.

In this embodiment, the receiving unit 501 of the apparatus for pushing information 500 receives a web page browsing request from the terminal using which the user browses a web page by means of wired connection or wireless connection. The web page browsing request includes an address of the web page (i.e., a website address) which the user desires to browse. The server acquires the video information of the video played by the user using the terminal by responding to the website address of the web page.

In this embodiment, based on the website address obtained in the receiving unit 501, the analyzing unit 502 may first acquire the video corresponding to the website address, and then analyze the video information by various analysis means, to extract one or more keywords. The keyword is expanded to generate an expanded keyword, and the keyword set is generated based on the keyword and the expanded keyword.

In this embodiment, the apparatus for pushing information 500 may pre-store a plurality of pieces of candidate push information. These pieces of the candidate push information may be combined with the video information, so as to be presented on the video as a whole in the form of bullet screen information. The matching unit 503 of the apparatus for pushing information 500 selects at least one piece of the candidate push information to generate the set of push information, based on the matching relationship between the keyword set and each piece of candidate push information.

In this embodiment, the pushing unit 504 pushes the candidate push information in the set of push information to the user of the terminal in a bullet screen form.

Referring to FIG. 6, a schematic structural diagram of a computer system 600 adapted to implement a terminal device or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a receiving unit, an analyzing unit, a matching unit and a pushing unit, where the names of these units or modules do not in some cases constitute a limitation to such units or modules themselves. For example, the receiving unit may also be described as "a unit for receiving video information of a user", and the pushing unit may be described as a bullet screen information display unit.

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to:

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: acquire video information of a video played by a user using a terminal, the video information comprising bullet screen information; analyze the video information to generate a keyword set; select at least one piece of candidate push information to generate a set of push information, based on a matching relationship between the keyword set and each piece of candidate push information; and pushing the set of push information to the terminal.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for pushing information, comprising:
    acquiring video information of a video played by a user using a terminal, the video information comprising bullet screen information, wherein the bullet screen information comprising user comments on a video in a scrolling form when the video is played;
    analyzing the video information and bullet screen information to generate a keyword set, the keywords set including a keyword included in the bullet screen information;
    selecting at least one piece of candidate push information including the keyword as a set of push information including the keyword, based on a matching relationship between the keyword set and each piece of candidate push information; and
    pushing the set of push information to the terminal in a form of bullet screen information, wherein the pushing the set of push information to the terminal comprises: presenting the set of push information including the keyword on the video, when the bullet screen information including the keyword is presented on the video.

2. The method according to claim 1, wherein the video information further comprises at least one of title information of the video, subtitle information of the video, audio information of the video, and image frame information included in the video.

3. The method according to claim 1, wherein the analyzing the video information to generate a keyword set, comprises:
    performing a statistical analysis and/or a semantic analysis on the video information to extract a keyword to generate the keyword set.

4. The method according to claim 1, wherein the candidate push information comprises text content, and a link associated with the text content.

5. The method according to claim 1, wherein the selecting at least one piece of candidate push information to generate a set of push information, based on a matching relationship between the keyword set and each piece of candidate push information comprises:
    acquiring user information of the user; and
    selecting the at least one piece of candidate push information to generate the set of push information, based on the matching relationship between the keyword set and the each piece of candidate push information, and a matching relationship between the user information and the each piece of candidate push information.

6. An apparatus for pushing information, comprising:
    at least one processor; and
    a memory storing instructions, which when executed by the at least one processor, cause the at least one processor to perform operations, the operations comprising:
    acquiring video information of a video played by a user using a terminal, the video information comprising bullet screen information, wherein the bullet screen information comprising user comments on a video in a scrolling form when the video is played;
    analyzing the video information and bullet screen information to generate a keyword set, the keywords set including a keyword included in the bullet screen information;
    selecting at least one piece of candidate push information including the keyword as a set of push information including the keyword, based on a matching relationship between the keyword set and each piece of candidate push information; and
    pushing the set of push information to the terminal in a form of bullet screen information, wherein the pushing the set of push information to the terminal comprises: presenting the set of push information including the keyword on the video, when the bullet screen information including the keyword is presented on the video.

7. The apparatus according to claim 6, wherein the video information further comprises at least one of title information of the video, subtitle information of the video, audio information of the video, and image frame information included in the video.

8. The apparatus according to claim 6, wherein the analyzing the video information to generate a keyword set, comprises: performing a statistical analysis and/or a semantic analysis on the video information to extract a keyword to generate the keyword set.

9. The apparatus according to claim 6, wherein the candidate push information comprises text content, and a link associated with the text content.

10. The apparatus according to claim 6, wherein the selecting at least one piece of candidate push information to generate a set of push information, based on a matching relationship between the keyword set and each piece of candidate push information comprises:

acquiring user information of the user; and selecting the at least one piece of candidate push information to generate the set of push information, based on the matching relationship between the keyword set and the each piece of candidate push information, and a matching relationship between the user information and the each piece of candidate push information.

11. A non-transitory non-volatile computer storage medium storing computer readable instructions executable by a processor, the instructions, when executed by the processor, causing the processor to perform a method for pushing information, comprising:

acquiring video information of a video played by a user using a terminal, the video information comprising bullet screen information, wherein the bullet screen information comprising, user comments on a video in a scrolling form when the video is played;

analyzing the video information and bullet screen information to generate a keyword set, the keywords set including a keyword included in the bullet screen information;

selecting at least one piece of candidate push information including the keyword as a set of push information including the keyword, based on a matching relationship between the keyword set and each piece of candidate push information; and pushing the set of push information to the terminal in a form of bullet screen information, wherein the pushing the set of push information to the terminal comprises: presenting the set of push information including the keyword on the video, when the bullet screen information including the keyword is presented on the video.

* * * * *